United States Patent Office 3,264,228
Patented August 2, 1966

3,264,228
METHOD OF PREPARING ALUMINA COATED CATALYST COMPOSITIONS
Bernard Whiting Burbidge, Sunbury-on-Thames, England, assignor to The British Petroleum Company Limited, Britannic House, London, England, a British joint-stock corporation
No Drawing. Filed Aug. 31, 1962, Ser. No. 220,869
Claims priority, application Great Britain, Sept. 27, 1961, 34,654/61
6 Claims. (Cl. 252—463)

This invention relates to the preparation of alumina hydrates and their use for the preparation of alumina-containing catalysts.

Alumina hydrates are well known chemical compounds and certain of them are extensively used as precursors in the preparation of alumina containing catalysts, particularly catalysts used for the conversion or purification of petroleum hydrocarbons. The alumina hydrates used to prepare the catalysts are $\alpha$-alumina monohydrate (boehmite), $\alpha$-alumina trihydrate (gibbsite) and $\beta$-alumina trihydrate (bayerite) and they may be used alone, or in admixture. The hydrates are produced by hydrolysis of aluminum-containing materials, for example aluminum metal, aluminum salts such as aluminum nitrate or chloride, or aluminum alcoholates. The chemical and physical characteristics of the hydrates are determined by the starting materials used, the conditions of hydrolysis, and the various treatments such as washing, filtering, ageing and drying employed to purify and isolate the hydrates. In certain cases these characteristics can be critical. For example when preparing catalysts in which the alumina is in the form of a thin film on an inert non-porous support, considerable care is necessary to ensure that the film is resistant to abrasion and adheres firmly to the support. A film prepared, for example, by immersing a support in a conventional alumina hydrate hydrogel is non-adherent and of a chalky consistency. Problems also arise when forming alumina supports by extrusion, particularly in controlling the amount of shrinkage when the extrudate is dried.

It has now been found that the conditions under which alumina hydrate hydrogels are dried affects the characteristics of the alumina hydrates produced and according to the present invention a method of preparing alumina hydrates comprises forming an alumina hydrate hydrogel by hydrolysis of an aluminum containing material and thereafter drying the hydrogel at a temperature of from 5 to 60° C. Preferably the temperature of drying is from 15 to 40° C.

The normal method of drying alumina hydrate hydrogels is to use an elevated temperature of for example 105° C. or thereabouts so as to reduce the drying time. It has been found, however, that if such temperatures are used the alumina hydrates are not easily re-slurried with water and if the slurries are used for preparing thin film catalysts, the films tend to be patchy, and non-adherent. By drying at a temperature of from 5 to 60° C., preferably 15–40° C., the drying time is lengthened but the alumina hydrates so formed are easily re-slurried, without the need for grinding, to give a colloidal suspension of very fine particles, the bulk of which pass, for example, through a whatman No. 1 filter paper. This suspension if used for preparing thin film catalysts, as described hereafter, gives films, which are harder, more even and more adherent than films prepared from, for example, a hydrogel.

The length of time of the drying should be adequate to give a dry, easily-handled material and it has been found in practice that the water content (including combined water) should be reduced to less than 70% wt. of the dried alumina hydrate. The water content may be determined by heating the hydrate at 550° C. for 2 hours.

It has been found that the dried alumina hydrate can normally be heated to a temperature of up to 100° C. without further change and without any further appreciable loss of water. It has also been found that the dispersion formed by re-slurrying the dried hydrate in water is stable at ambient temperature and exists as a semi-colloidal suspension with particles of the order of 2 microns diameter or less.

Any convenient aluminum containing material and hydrolyzing conditions may be used for the preparation of the alumina hydrate hydrogels, but one prepared from aluminum nitrate by precipitation with alkali, for example ammonia, has been found to be particularly suitable when preparing alumina hydrates for thin film catalyst manufacture. The hydrolysis may include the conventional steps of washing, and filtering, and ageing if desired.

The alumina hydrates prepared according to the present invention may be subsequently used to prepare alumina-containing catalysts, and the present invention includes the preparation of alumina-containing catalysts by a method which includes the steps of preparing an alumina hydrate as described above and thereafter calcining the hydrate to alumina. The method will, naturally, include a step of forming the material into a suitable form, for example into granules, pellets or rods, at the appropriate point in the preparation. One particularly suitable method includes the steps of forming the alumina hydrate into an extrudable slurry, with a liquid medium, for example water, extruding the slurry and drying and calcining the extrudates so produced. Such extrudates shrink less on drying than an extrudate prepared directly from a hydrogel.

The invention also includes the preparation of catalysts having a thin film of alumina-containing material on a support comprising forming an alumina hydrate as defined above, coating the support with a thin film of alumina hydrate and thereafter calcining the alumina hydrate to alumina. Preferably the alumina hydrate is suspended in a liquid medium, for example water, and the support can then be coated by immersing it in the suspension or by flowing the suspension over it. If desired the suspension may have an aluminum salt, for example aluminum nitrate, added to it to assist in the formation of an even and adherent film. The amount added should be below that which causes coagulation of the suspension and in the case of aluminum nitrate is preferably less than half the weight of alumina hydrate present. The suspension may also contain added powdered alumina, preferably in an amount which is not more than the weight of alumina hydrate present. The film is then preferably dried before the calcination, but in the case of this drying the temperature is not critical. The final film of alumina-containing material is preferably from $1\mu$ to $300\mu$ thick and a particularly preferred range is 20 to $200\mu$. The thickness may be controlled for example, by adjusting the viscosity of the suspension, by changing the ratio of liquid medium to alumina hydrate in the suspension or by varying the number of times that the support is contacted with the suspension. The optimum conditions for any given materials and film thickness may be determined by simple experiment.

In all the catalyst preparations, the calcination may follow the normal procedure, i.e. heating to a temperature above 400° C. but below that at which damage to the catalyst occurs. Thus the temperature may be 400 to 650° C., preferably 500 to 600° C., for a period of from 1 to 24 hours.

The support used for the thin film catalysts may be of any convenient nature and form, provided it has no deleterious affect on the reactions for which the catalyst is to be used. It may, if desired, have some inherent activity, in which case the addition of a surface layer will primarily serve to raise the overall activity of the catalyst. Alternatively the support may be inactive, and serve primarily as a convenient geometric surface for the active catalyst film. Examples of active supports are the known activated refractory oxides and examples of inactive supports are metals, for example aluminum, or inactive refractory oxides, for example α-alumina. Preferably the form is such that the support has a large geometric surface area and this may be achieved by using metal gauze, meshes, wires or foils suitably corrugated or disposed to give a large surface area with a distance of 50µ or more between adjacent surfaces. In the case of refractory oxides the support is preferably macroporous with pores having diameters of 50µ or more.

The alumina-containing catalysts also desirably have catalytically active materials associated with the alumina, the type of material depending on the use for which the catalyst is to be put.

Examples of suitable catalytically active materials which may be added to the alumina-containing catalysts are:

For processes involving cracking or breakdown of the feedstock—silica or magnesia, For processes involving hydrogenation or dehydrogenation—one or more metals or metal compounds having hydrogenating activity selected from Groups VIa and VIII of the Periodic Table, which may be present in an amount of less than 50% and preferably less than 25% by weight of the catalyst. Thus the catalyst may contain from 5 to 25% wt. of an oxide or sulphide of a Group VIa metal, with or without 1 to 10% wt. of an oxide or sulphide of an iron group metal. Other catalysts may contain, for example from 0.01 to 10% wt. of a platinum group metal or from 1 to 25% wt. of an iron group metal. All percentages given above refer to the weight of metal present.

This catalytically active material may be added at any suitable point in the catalyst preparation the method selected depending both on the chemical nature and the final form of the catalyst. It may for example be coprecipitated with the original aluminum hydroxide, added to the hydrogel, or to the alumina hydrate suspension, or added to the catalyst by impregnation after the calcination of the hydrate to alumina.

However, in the case of catalysts prepared by reslurrying the dried alumina hydrate in water, for example thin film catalysts, it has been found that the presence of ammonium molybdate and cobalt nitrate in the alumina hydrate is deleterious, since the alumina hydrate is less easily dispersed to form the slurry. In such cases, therefore, the catalytically active material should be added by impregnation of the alumina after calcination.

The alumina-containing catalysts may be used for a wide variety of processes, but they are particularly suitable for the treatment of hydrocarbon feedstocks, for example those of petroleum origin. Examples of suitable processes are catalytic cracking, hydrocatalytic cracking, reforming, hydrogenation, isomerization, alkylation, dealkylation, hydrocatalytic desulphurization and oxidation. Catalysts having a thin film of alumina-containing material on a support are particularly suitable for processes in which at least a proportion of the feedstock is in the liquid phase. They could be used, for example, for a predominantly liquid phase gasoline treatment process such as low temperature selective hydrogenation, but they are particularly suitable for the catalytic treatment of feedstocks boiling in the gas oil boiling range and above, including atmospheric and vacuum residues. One example of a suitable process is the hydrocatalytic desulphurization of crude oils and residues. A particularly suitable catalyst for the hydrocatalytic desulphurization of crude oils and residues comprises 1–10% wt. of cobalt and 5–25% wt. of molybdenum (present as the oxides as such or in combined form, as cobalt molybdate, or both) and alumina, the alumina containing the oxides being in the form of a thin film on a support.

Another potential use for the thin film catalysts is for gaseous phase reactions which are capable of being carried out at relatively high space velocities, for example the removal of minor amounts of impurities from gas streams or the catalytic oxidation of internal combustion engine exhaust gases.

The invention is illustrated by the following examples:

EXAMPLE 1

This example shows the preparation of an alumina hydrate and its ability to be redispersed.

An alumina hydrogel was prepared by treating a solution of 2 kg. aluminum nitrate in 2½ liters of water with ammonia until the pH had risen to 8–8.5. The hydrogel was washed thoroughly and aged at 70° C. for 16 hours. A sample of this hydrogel was placed in a shallow tray in an air circulating oven and dried at 30° C. 5 g. of the dried alumina hydrate were redispersed by gentle stirring in 50 ml. of water. The suspension, when viewed under a microscope, was observed to consist of discrete particles of less than 2–3µ diameter. The suspension was centrifuged at 1500 r.p.m. for 15 minutes, when a small amount (25%) of the suspension settled out as a sediment. The sediment when viewed under a microscope was observed to consist of particles of 1–3µ diameter, while the supernatant suspension contained only particles of less than 1µ diameter.

EXAMPLE 2

This example compares different methods of preparing thin film catalysts.

10 g. of the alumina hydrate dried in air at 30° C. as described in Example 1 were dispersed in 100 ml. water. The suspension was divided into 2 equal parts and 1 g. aluminum nitrate was added to one half. Pieces of aluminum foil were then dipped into:

(a) The alumina hydrogel of Example 1,
(b) The redispersed alumina hydrate of Example 2, and
(c) The aluminum nitrate-containing redispersion of Example 2.

Surplus slurry was drained from the specimens which were subsequently dried at 90° C. and calcined at 550° C.

On examination, the alumina film produced directly from the hydrogel was found to be patchy and non-adherent while the films produced from the redispersed alumina hydrate (with and without aluminum nitrate) were found to be uniform and adherent. The results are summarized in Table 1 below

*Table 1*

| Coating slurry | Hydrogel | 10 g. Dried (30° C.) $Al_2O_3 \cdot 3H_2O$, 100 ml. $H_2O$ | 10 g. Dried (30° C.) $Al_2O_3 \cdot 3H_2O$, 100 ml. $H_2O$, 1 g. $Al(NO_3)_3 \cdot 9H_2O$ |
|---|---|---|---|
| Coating: | | | |
| Uniformity | Reasonable | Good | Good. |
| Abrasion resistance. | Very poor | do | Good-excellent. |

EXAMPLE 3

This example shows the effect of varying the temperature of drying of the alumina hydrate.

An alumina hydrogel was prepared as in Example 1 and divided into 5 portions. Three of the portions were dried at 30° C., 55° C. and 100° C., respectively. The other two portions had ammonium molybdate and cobalt nitrate added to them in an amount to give 2.5% wt. cobalt oxide (CoO) and 15% wt. molybdenum oxide ($MoO_3$) by weight of total cobalt, molybdenum and aluminum oxides; these two portions were dried at 40° C. and 70° C. respectively. The dried alumina hydrates were then slurried with water as in Example 1. The results obtained are given in Table 2 below.

*Table 2*

| Material | Alumina Hydrogel | | | CoMo/ Alumina Hydrogel | |
|---|---|---|---|---|---|
| Drying temperature, °C | 30 | 55 | 100 | 40 | 70 |
| Water content of dried material,[1] percent wt. | 34.1 | 36.0 | 34.6 | | |
| Empirical formula | $Al_2O_3 \cdot 3H_2O$ | $Al_2O_3 \cdot 3H_2O$ | $Al_2O_3 \cdot 3H_2O$ | | |
| Crystalline structure | Bayerite | | | | |
| Redispersability in water | Good | → Increasing → | Reasonable | Very poor. | |
| Particles >2μ in dispersion | Nil | | Few | All >2μ. | |
| Brownian movement in dispersion | Yes | Yes | Yes | No ↑ No | |

[1] The water content was determined by heating the hydrate at 550° C. for two hours.

The table shows that the size of the particles present and the difficulties of dispersion increase with increasing drying temperature, and also shows the disadvantage of adding cobalt and molybdenum salts to the hydrogel.

EXAMPLE 4

This example compares the activity of a catalyst prepared from alumina hydrate according to the present invention and a standard catalyst.

An alumina hydrate was prepared according to Example 1. 150 g. of the hydrate were dispersed in 300 ml. of water. 15 g. of aluminum nitrate were added and the dispersion was partially dried to a consistency suitable for extrusion. The extrudate was dried at 105° C., calcined at 550° C. for 2 hours and then impregnated with cobalt nitrate and ammonium molybdate solution in an amount to give 2.5% wt. of cobalt oxide (CoO) and 15% wt. molybdenum oxide ($MoO_3$) in the finished catalyst. The impregnated catalyst was re-dried and re-calcined as above and, in order to bring it into a form strictly comparable with the standard catalyst it was then powered and pelleted to ⅛" x ⅛" pellets.

The standard catalyst was prepared from a hydrogel dried at a temperature above 100° C. and contained the same amount of cobalt and molybdenum oxides as the catalyst prepared according to the present invention.

The two catalysts were tested for desulphurization activity using a Middle East wax distillate feedstock having an ASTM boiling range of 350–550° C. and containing 2.8% wt. of sulphur. Co-current downflow of gas and liquid feedstock through the catalyst bed was employed. The process conditions used and the results obtained are given in Table 3 below, from which it will be seen that the catalyst of the present invention was comparable to the standard catalyst in activity.

*Table 3*

COMPARISON OF ACTIVITY OF STANDARD AND "REDISPERSED" CATALYSTS

| Catalyst | Standard | | | "Redispersed" | | |
|---|---|---|---|---|---|---|
| Catalyst size | ⅛" x ⅛" pellets | | | ⅛" x ⅛" pellets | | |
| Space velocity, v./v./hr | 4 | | | 4 | | |
| Once through $H_2$ rate, s.c.f./b. | 750 | | | 750 | | |
| Pressure, p.s.i.g. | 500 | | | 500 | | |
| Temperature, °F | 660 | 700 | 740 | 660 | 700 | 740 |
| Desulphurization, percent | 25.5 | 40.1 | 58.7 | 29.2 | 38.5 | 52.2 |

EXAMPLE 5

This example shows the desulphurization activity of a thin film catalyst.

An alumina hydrate was prepared as in Example 1. 45 g. of the hydrate were dispersed in 200 ml. of water and 6 g. of aluminum nitrate were added. Aluminum foil was degreased with a chromicphosphoric acid mixture until the surface was completely wetted with water when washed. The foil was immersed in the freshly stirred dispersion, drained, dried vertically at, initially ambient temperature and then at 110° C. The dried specimens were then calcined at 550° C. for 2 hours. The coated foil was then impregnated with a cobalt nitrate and ammonium molybdate solution in an amount to give 3.0% wt. cobalt and 14.7% wt. molybdenum in the finished film. The impregnated specimens were dried at 110° C. and cut into strips 1 inch long by 0.02 inch wide. Groups of these strips were loosely tangled into balls of ⅛ inch diameter and the catalyst was finally calcined at 550° C. for 2 hours. The properties of this catalyst are given in Table 4 below:

*Table 4*

| Catalyst type | CoMo/alumina on aluminum foil |
|---|---|
| Catalyst form | Strips of 1 in. x 0.02 in. x 0.002 in. loosely wound into balls of 0.125 in. diameter |
| SURFACE AREA | |
| Aluminum coated, cm.²/g | 134 |
| Aluminum not coated (edges), cm.²/g | ca. 14 |
| BET surface area of total catalyst, m.²/g | 11 |
| BET surface area of surface film only, m.²g | 131 |
| Bulk density, g./ml | [1] 0.20 |
| Void space, percent vol | [2] 91 |
| SURFACE CATALYST LAYER | |
| Quantity, percent wt. total catalyst | 8.4 |
| Thickness, cm | $6 \times 10^{-4}$ |
| Cobalt content, percent wt | 3.0 (CoO=3.8) |
| Molybdenum content, percent wt | 14.7 ($MoO_3$=22.1) |

[1] Minimum figure — Values are influenced by the
[2] Maximum figure — compressibility of the catalyst.

The catalyst was then tested for desulphurization activity using a Middle East wax distillate feedstock having an ASTM boiling range of 300–580° C. and containing 2.79% wt. of sulphur.

The process conditions for the desulphurization were:

Volume of catalyst charge, ml. _____ 250
Weight of catalyst charge, g. _____ 52
Temperature, °F. _____ 780
Pressure, p.s.i.g. _____ 1000
Gat rate (once-through hydrogen), s.c.f./b. _____ 750
Liquid space velocity (based on volume of total catalyst), v./v./hr. _____ 1
Liquid space velocity (based on weight of surface catalyst layer), w./w./hr. _____ 50

In order to obtain a high mass flow of feedstock of 1250 lb./ft.²/hr., the process was carried out by passing the feedstock 5 times through the catalyst bed to give the overall space velocities given above.

The catalyst was then regenerated using a gas mixture of nitrogen and 5% volume of air, the maximum temperature being not more than 1000° F. until there was no carbon dioxide in the exit gas.

The desulphurization test was then repeated with fresh feedstock, this time with three passes equivalent to an overall space velocity, based on total catalyst, of 4 v./v./hr. and, based on the surface catalyst layer, of 200 w./w./hr.

The catalyst was regenerated again as indicated above and a third run carried out with a single pass at a low mass velocity (78 lb./ft.²/hr.) giving the same overall space velocity as run 1.

The percentage desulphurization for the three runs was, respectively, 11.5%, 15.4% and 12.5%.

Examination of the catalyst at the end of the experiments showed that only a small amount (10–20%) of the surface catalyst layer had been removed in spite of the severe desulphurization and regeneration conditions.

The apparently low percentage of desulphurization is considered to be the result of the particular form of the catalyst used.

Example 4 shows that the pelleted catalyst had comparable activity with a standard catalyst, so that the low percentage desulphurization was not due to inherent lack of catalyst activity. The surface catalyst layer was, however, only 6μ thick and the geometric surface area of the catalyst was such that the runs were carried out at very high space velocities, based on the weight of active surface catalyst layer, well above those normally employed. Considerably improved results, at least comparable to those of a standard catalyst, would be expected to be obtained by reducing the space velocity to a figure nearer that normally employed.

I claim:

1. A method of preparing alumina-containing catalysts, comprising: forming an alumina hydrate hydrogel, drying the hydrogel at a temperature of from 15 to 40° C. to a water content, including combined water, of less than 70% weight of the dried alumina hydrate, and dispersing said dried alumina hydrate in water to give a colloidal suspension stable at ambient temperature and containing only particles of alumina hydrate of not more than two microns diameter, forming a catalyst structure from said colloidal suspension by applying said suspension as a thin film to a catalytically inactive support and drying the thin film so produced, and calcining the alumina hydrate to alumina.

2. A method as claimed in claim 1 wherein the alumina film has a thickness of from 1 to 300 microns.

3. A method as claimed in claim 1 wherein the alumina film has a thickness of from 20 to 200 microns.

4. A method as claimed in claim 1 wherein the inactive support is coated by immersion in a suspension of alumina hydrate and then dried.

5. A method as claimed in claim 4 wherein the suspension contains an aluminum salt.

6. A method as claimed in claim 5 wherein the aluminum salt is aluminum nitrate.

References Cited by the Examiner
UNITED STATES PATENTS

| | | | |
|---|---|---|---|
| 2,274,634 | 3/1942 | Heard | 252—463 XR |
| 2,580,806 | 1/1952 | Malina | 252—463 |
| 2,742,437 | 3/1956 | Houdry | 252—455 |
| 2,867,588 | 1/1959 | Keith et al. | 252—466 |
| 3,024,088 | 3/1962 | Palmqvist et al. | 23—143 |
| 3,162,607 | 12/1964 | Burbidge et al. | 252—463 XR |
| 3,167,499 | 1/1965 | Haresnape et al. | 252—477 XR |

MILTON WEISSMAN, *Primary Examiner.*

MAURICE A. BRINDISI, *Examiner.*

G. T. OZAKI, *Assistant Examiner.*